(12) United States Patent
Wood (10) Patent No.: US 6,700,584 B1
(45) Date of Patent: Mar. 2, 2004

(54) METHOD AND APPARATUS FOR HANDLING TRANSLUCENCY IN 3D GRAPHICS

(75) Inventor: Karl J. Wood, Crawley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 475 days.

(21) Appl. No.: 09/644,272

(22) Filed: Aug. 23, 2000

(30) Foreign Application Priority Data

Sep. 16, 1999 (GB) ............................................. 9921777

(51) Int. Cl.⁷ ................................................. G09G 5/00
(52) U.S. Cl. ........................ 345/581; 345/428; 345/422; 345/592; 345/614
(58) Field of Search ................................ 345/422, 592, 345/614

(56) References Cited

U.S. PATENT DOCUMENTS

| | | | |
|---|---|---|---|
| 5,363,475 A | 11/1994 | Baker et al. ................. | 395/122 |
| 5,392,385 A | 2/1995 | Evangelisti et al. ......... | 395/131 |
| 5,739,818 A | 4/1998 | Spackman .................. | 345/425 |
| 5,771,046 A | 6/1998 | Isawa et al. ................. | 345/427 |
| 5,864,342 A * | 1/1999 | Kajiya et al. ................ | 345/418 |
| 6,473,082 B1 * | 10/2002 | Hong et al. .................. | 345/422 |

FOREIGN PATENT DOCUMENTS

| | | | |
|---|---|---|---|
| EP | 0447195 A2 | 3/1991 | |
| GB | 2226937 B | 7/1990 | ............ G06F/15/72 |
| GB | 2320875 A | 7/1998 | ............ G06T/15/00 |
| WO | WO9906957 | 2/1999 | ............ G06T/16/10 |
| WO | WO 99/06957 * | 2/1999 | ............ G06T/15/10 |

OTHER PUBLICATIONS

Foley et al., "Computer Graphics: Principles and Practice." Addison–Wesley. Jul. 1997. $2^{nd}$ edition. p. 835–840.*

* cited by examiner

Primary Examiner—Matthew C. Bella
Assistant Examiner—Antonio Caschera (57) ABSTRACT

In a method of image processing for rendering a two-dimensional pixel image from a plurality of triangular image primitives to be projected onto an image plane, parameter values at positions within the triangles are translucency values. All the translucent pixel fragments are characterised as partial fragments, and the fragments are inserted into a pixel fragment buffer from front to back. The final colour of a pixel is determined from the foremost fragment.

9 Claims, 7 Drawing Sheets

METHOD AND APPARATUS FOR HANDLING TRANSLUCENCY IN 3D GRAPHICS

This invention relates to a method and apparatus for handling translucency in rendering of graphic images composed of a plurality of triangular image primitives.

Translucency techniques are applied in 3D graphics not only to provide images of translucent objects, when anti-aliasing is difficult where such objects overlap, but also to allow smooth transition from one model to another to allow substantial changes in model size; the application of fade level of detail is applied in flight simulators when objects recede rapidly.

In 3D graphics a translucent object allows objects behind it to be visible through it in attenuated form, while an opaque object obscures any other object behind it. Translucency is typically monochrome, i.e. there is one alpha component common to red, green and blue colour components; if each colour component has its own alpha component, then the well known effects of subtractive colour mixing apply at object overlaps.

One model of translucency is the small hole model. If a translucent object is made by peppering a coloured opaque object with a myriad of holes so small as to be invisible to the human eye, objects behind the translucent object are visible through the holes. Translucency can be defined as the area occupied by holes per unit area of the objects surface.

Consider looking through a succession of overlapping translucent objects, each with a translucency of 0.25, using the above small hole model. The nearest object has its colour attenuated by 0.75, because only 0.75 of the object surface area reflects light and the remaining 0.25 comprises holes. The second nearest object has its colour attenuated by (0.25*0.75); only 0.25 of the second object's surface is visible through the holes in the first object, and of that surface only 0.75 reflects light. This is shown in Table 1 below for objects of equal translucency.

TABLE 1

Cumulative attenuation of equally translucent objects

| Object position | Area of holes | Area reflecting light | Attenuation | Sum of Attenuations |
|---|---|---|---|---|
| 1 (nearest) | 0.25 | 0.75 | 0.75 | 0.7500 |
| 2 | 0.25 | 0.75 | 0.25 * 0.75 | 0.9375 |
| 3 | 0.25 | 0.75 | 0.25 * 0.25 * 0.75 | 0.9844 |
| 4 | 0.25 | 0.75 | 0.25 * 0.25 * 0.25 * 0.75 | 0.9961 |

If the objects are of differing translucencies, the position is that illustrated in Table 2 below.

TABLE 2

Cumulative attenuation of unequally translucent objects

| Object position | Area of holes | Area reflecting light | Attenuation | Sum of Attenuations |
|---|---|---|---|---|
| 1 (nearest) | 0.40 | 0.60 | 0.60 | 0.6000 |
| 2 | 0.30 | 0.70 | 0.40 * 0.70 | 0.8800 |
| 3 | 0.20 | 0.80 | 0.30 * 0.40 * 0.80 | 0.9760 |
| 4 | 0.10 | 0.90 | 0.20 * 0.30 * 0.40 * 0.90 | 0.9976 |

Assume that each pixel fragment fully covers the pixel; to determine the final colour of a given pixel on the screen, pixel fragments are rendered in front to back order, each being textured and shaded independently. The colour of each pixel fragment is attenuated to account for the effects of translucent fragments in front of it, the amount of attenuation being calculated after the example of Table 2 above.

It is apparent from Tables 1 and 2 that the sum of the attenuations (cumulative attenuation) approaches unity; indeed the sum of attenuations must be unity to obtain the final pixel colour. For a finite number of translucent surfaces at a given pixel, assume there is an opaque background, for example the sky, attenuate its colour by unity minus the sum of the attenuations (thereby forcing the final sum of attenuations to unity) and add the result to the final pixel colour.

Typically, translucency is assigned a numeric value which can be considered to lie in the range 0.0 to 1.0; this range might be mapped to the integers 0 to 256 in a hardware implementation.

The value of 256 is inconvenient, requiring 9 bits to encode 257 values, when 8 bits suffice for values in the range 0 to 255. Some systems map the range 0.0 to 1.0 onto the range 0 to 255, but this makes it awkward to represent values such as 0.25, 0.5 and 0.75. Some systems map the range 0.0 onto the range 0 to 256, and then represent the value 256 as 255.

By convention the term "translucency" maps opaque objects to the value 0.0 and transparent objects to the value 1.0, because translucency increases over the range. The term "opacity" is applied when translucent objects are mapped to the value 0.0 and opaque objects to the value 1.0, because opacity increases over the range. The term "alpha" is used to refer to the value irrespective of whether it is interpreted as translucency or opacity.

In real time consumer 3D graphics, there are three types of translucency; conventional, texture, and screendoor.

Conventional translucency is applied to an entire object, mesh or face, and is typically represented by eight bits for 256 different levels of translucency. Conventional translucency has a cumulative attenuation effect when objects are viewed through several layers or translucency.

If an increasing amount of conventional translucency is applied to a VRML model of an object, the expectation is that the object will fade away; in practice unexpected dark regions may occur, because real time 3D graphics models make use of intersecting faces; for example the mesh representing a character's leg will penetrate the mesh representing the character's body to prevent gaps and cracks appearing at the join under animation; rather than trimming the intersecting polygons to fit, the "spare parts" of the polygons are just left in the knowledge that in normal use they remain hidden behind an opaque surface of the intersecting polygon. However when the technique of translucency is applied, the intersection appears dark because there are more translucent surfaces than expected.

Screendoor translucency is a technique in which an object is literally peppered with holes, e.g. by not drawing certain pixels in the object. The more pixels that are omitted, the greater the apparent translucency. For example a translucency of 0.5 is simulated by drawing every other pixel, but a regular pattern of missing pixels must be avoided because it can become annoyingly apparent to a viewer. This need to avoid a regular pattern limits the number of discreet levels of translucency which can be achieved by using screendoor translucency.

For the typical application of translucency in fade level of detail, conventional translucency is unsuitable because of the unexpected dark regions at intersections, so screendoor translucency is preferred.

In U.S. Pat. No. 5,864,342 Microsoft Corporation, a method of rendering graphical objects which may be translucent is disclosed in which geometric primitives of models are divided into "chunks" and pixel fragments for each chunk are generated then resolved. Texture mapping and filtering occurs prior to anti-aliasing the texture-mapped primitive, but there is no reduction of the number of attributes to be calculated.

In co-pending application WO99/06957 an invention is disclosed in which pixels from triangular image primitives are provided with inside flags which are used to determine contributions from values, such as colour or texture, stored at each vertex of the triangle, to give attribute values to each pixel. Pixel attribute values from all triangles jointly determine an output colour for each pixel.

The present invention is an improvement of that technique which allows translucency in a 3D graphics system to be handled.

According to the present invention, there is provided an image processing method for rendering a two dimensional pixel image from a plurality of triangular image primitives to be projected onto an image plane, in which per-pixel attribute values, derived by interpolation from values held for the triangle vertices, are mapped onto respective pixels within the projected triangular primitives, in which, for each triangle:

prior to projection, the triangle is parameterised with a respective two-dimensional co-ordinate system with the co-ordinate axes (s,t) concurrent with respective edges of the triangle and the origin coincident with the vertex between said edges;

during projection, a generalised interpolation function is applied in terms of the parameterising co-ordinate system, determining parameter values at positions within the triangle in terms of the two-dimensional co-ordinate system;

following projection, the determined parameter values at positions within the triangle determine contributions from the stored values for one or more attributes at each vertex, to give attribute values at each pixel;

characterised in that said parameter values at positions within the triangle are translucency values.

Also according to the invention there is provided processing apparatus configured to render a two dimensional pixel image from data defining a plurality of triangular image primitives to be projected onto an image plane, the apparatus including interpolation means arranged to derive per-pixel attribute values from values held for the triangle vertices, and data handling means arranged to map said per-pixel attribute values onto respective pixels within the projected triangular primitives:

calculation means coupled to receive the data defining said triangular primitives, prior to projection, and arranged to parameterise each triangle with a respective two-dimensional co-ordinate system with the co-ordinate axes (s,t) concurrent with respective edges of the triangle and the origin coincident with the vertex between said edges;

projection means operable to apply a generalised interpolation function to each triangle and in terms of the parameterising co-ordinate system, such as to derive parameter values at positions within a triangle in terms of said two dimensional co-ordinate system; and pixel shading means configured to derive, from said determined parameter values at positions within the triangle, contributions from said stored values for one or more attributes at each vertex, such as to give attribute values at each pixel, and to combine per pixel attribute values from all triangles and provide a per pixel colour value, characterised in that the apparatus further comprises means to characterise a pixel as a translucent pixel, and when a translucent pixel overlays another pixel, to provide a per pixel colour value derived from the colour of the foremost translucent pixel.

In the inventive method, a number of flags inside each triangle are supplied as main attributes indicating whether pixel fragments are translucent or opaque; this allows the fragments to be correctly inserted into the pixel fragment buffer, because the actual translucency is not known until a texturing or shading step has been performed.

When the type of translucency to be applied by the inventive method is screendoor translucency, then some of the inside flags of a pixel fragment are masked off when it is proposed to the pixel fragment buffer. Preferably screendoor translucency is encoded to a limited number of translucency levels, (e.g. 8 levels, using 3 bits), and the levels are converted by use of a look-up table to the required number (e.g. 32) of bit masks.

Conventional translucency values could be made available as main attributes, but would require an additional number of bits to hold the main attributes. Neither texture translucency nor screendoor translucency can be a main attribute because they are both applied per pixel and not per face. For conventional translucency, texture translucency and e.g. eight levels of screendoor translucency in the inventive method, it is necessary to provide only four extra bits per main attribute and four extra bits per pixel fragment, so the pixel fragment buffer can still be provided relatively cheaply.

During the rendering process in the inventive method, pixel fragments are rendered from the front of an object to the back of an object; the alpha values of rendered translucent pixel fragments are accumulated until their sum exceeds unity; a correction is then made as a function of the colour and alpha of the last pixel fragment such that the summed alpha equals unity.

As each translucent fragment is rendered, its colour is attenuated in proportion to the product of several alpha values, such as for conventional translucency or texture translucency.

The invention will now be described by way of example only, with reference to the accompanying drawings, in which.

Figure 1:
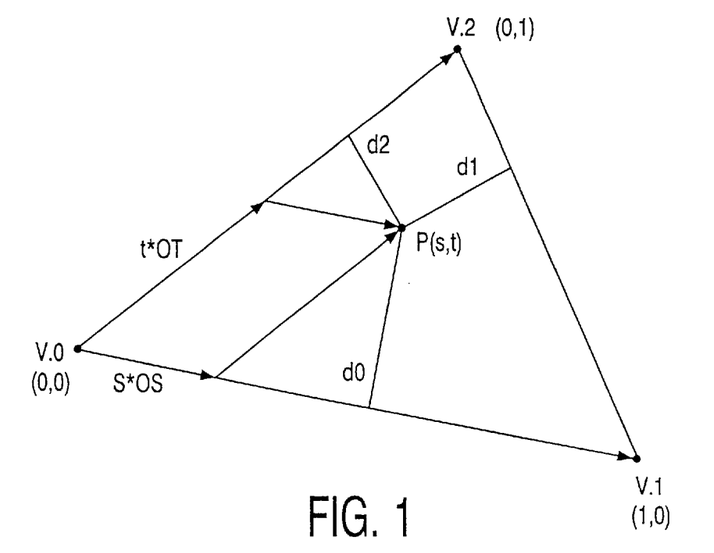
FIG. 1 illustrates the parameterisation of a triangular image primitive.

FIG. 1 illustrates the parameterising in the view space plane of a triangle with a point p inside the triangle having co-ordinates s and t. It will be noted that (s,t) as defined below are similar to barycentric co-ordinates of the form (1−s−t, s, t) used for centre of gravity calculations although, as will become apparent, their use in the attribute interpolation technique embodying the invention differs in a number of ways. The s axis runs through vertices V.0 and V.1 of the triangle, the t axis runs through vertices V.0 and V.2, the origin lies at vertex V.0, vertex V.1 is at (s,t)=(1,0) and vertex V.2 is at (s,t)=(0,1). As referred to hereinafter, Edge 0 is that running from vertex V.0 to vertex V.1, Edge 1 is that running from vertex V.1 to vertex V.2, and Edge 2 is that running from vertex V.2 to vertex V.0.

Given perspective-correct values (s,t), at some point P the perspective correct value of an attribute Q[P] can be calculated from:

$$Q[(s,t)]=Q[0]+s*(Q[1]-Q[0])+t*(Q[2]-Q[0])$$

It is clearly advantageous that texture is perspective correct; non-perspective correct shading is tolerable but, with the advent of better lighting models, the lack of perspective correction becomes noticeable, especially on highlights. Perspective correction can be achieved by interpolating s/z, t/z and 1/z instead of s and t. Interpolating 1/z also makes hidden surface removal perspective correct, which is not the case when simply interpolating z.

Start and delta values of (s/z, t/z) and 1/z can be calculated from the view space vertices of the triangle at any point on the screen. The following three cases are optimised to suit the orientation of the plane of the triangle in view space:

Case C:

$$Kc=OSx*OTy-OTx*OSy$$

$$s/z=[+OTy*(xs/d-Ox/z)-OTx*(ys/d-Oy/z)]/Kc$$

$$t/z=[-OSy*(xs/d-Ox/z)+OSx*(ys/d-Oy/z)]/Kc$$

Case B:

$$Kb=OTx*Osx-OSx*OTz$$

$$s/z=[-OTz*(xs/d-Ox/z)+OTx*(1-Oz/z)]/Kb$$

$$t/z=[+OSz*(xs/d-Ox/z)-OSx*(1-Oz/z)]/Kb$$

Case A:

$$Ka=OTz*OSy-OSz*OTy$$

$$s/z=[-OTy*(1-Oz/z)+OTz*(ys/d-Oy/z)]/Ka$$

$$t/z=[+OSy*(1-Oz/z)+OSx*(ys/d-Oy/z)]/Ka$$

The cost of dividing s/z and t/z by 1/z to obtain s and t is comparable to perspective correction of a single texture address, and it will be noted that using more than one texture per triangle remains perspective correct without requiring extra divisions by 1/z.

Using (s,t) simplifies inside-outside I-O testing. Given (s,t) co-ordinates based upon the view space triangle vertices (O,S,T), the sign of the t co-ordinate splits the plane of the triangle into two along a line co-incident with the vector OS. Similarly, the sign of the s co-ordinate splits the plane either side of the vector OT. This provides an I-O test for two out of the three edges.

The third edge between vertices S and T is defined by the equation s+t==1 hence an I-O test can be performed on the third edge. Whilst s and t are not available directly, s/z, t/z and 1/z are already available and since the sign of 1/z is constant (negative) for points in front of the viewer, the tests based upon the polarities of s and t can use s/z and t/z. Using this, the third test is rewritten s/z+t/z==1/z, the variables for which are already available.

With regard to clipping, the present architecture operates in a straightforward manner and does not require special clipping algorithms when (s/z, t/z, 1/z) are used for I-O tests. It is not necessary to generate clipped triangles, neither is it necessary to calculate associated attributes. This is a considerable advantage over architectures based upon screen space vertices.

Figure 2:
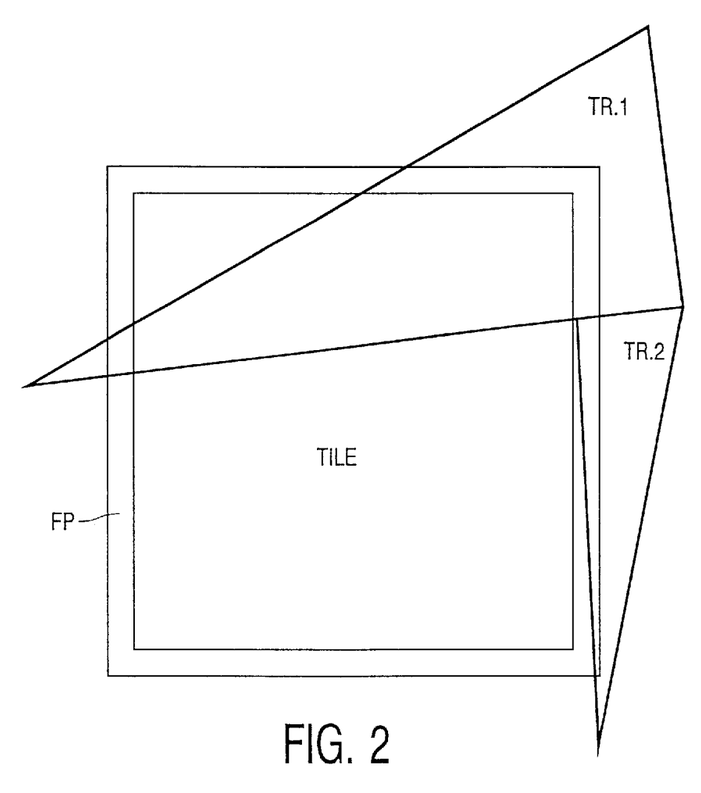
FIG. 2 represents triangular image primitives impacting a pixel filter kernel.

An image is rendered by sequentially and independently rendering small areas of the screen (tiles), an example of which is shown in FIG. 2. In the following example, a tile has dimensions of 8×8 pixels. To render a tile, an initial determination is made as to which triangles impact the tile. With reference to FIG. 2, a triangle impacts a tile if it has some visible effect on the rendered tile, that is to say the triangle overlaps the tile (as TR.1) or, if non-overlapping, is close enough to have some visible effect on the rendered tile (as TR.2). The tile footprint FP is the region that a triangle must overlap if it is to have a visible effect; the choice of anti-aliasing algorithm determines the tile footprint but satisfactory results have been obtained with a footprint extending one-half pixel outwards from the tile edges, giving an 8×8 pixel tile a tile footprint of 9×9 pixels.

As a control feature, a so-called "magic" point is identified. The magic point is co-incident with a pixel centre, is used for absolute calculations of parameters which are subsequently interpolated incrementally, and is required to be inside the triangle's bounding box and on-screen. The magic point is determined as part of the triangle to tile segmentation procedure. Since as mentioned above, triangles do not need to be clipped, the magic point calculation is the same for all triangles, whether entirely on-screen or partially on-screen. Values at vertices remain unchanged for all triangles; it is not necessary to generate new vertices or new triangles at any time.

Each on-screen triangle is allocated an integer value as a face identifier. If a triangle impacts a tile, the face identifier is pushed on a tile fragment stack holding the face identifiers of all triangles impacting the tile. When the tile fragment stack is read the face identifier is used to access the triangle's attributes. Each tile fragment stack corresponds to a tile sized screen area and, collectively, the tile fragment stacks comprise the tile fragment buffer. Each tile fragment stack has an (x,y) address in the tile fragment buffer which is used to generate pixel addresses as required. A tile fragment consists of a face identifier and a stack (x,y) address. A tile fragment stack is conceptually a stack of tile fragments, but in practice it is a stack of face identifiers associated with a stack (x,y) address.

Although tiles could be rendered independently and in any order, it is preferred to exploit coherence between tiles by reading the tile fragments in zigzag raster scanning order, starting at top left, scanning even numbered rows from left to right, odd numbered rows from right to left, and row pairs from top to bottom. In a real-time implementation, when a sufficient number of tiles have been rendered, they can be read and passed to the display without worrying about attempts to read pixels that have not yet been rendered. This requires a FIFO buffer to hold the rendered tiles but avoids the cost of a full screen frame buffer.

Figure 3:
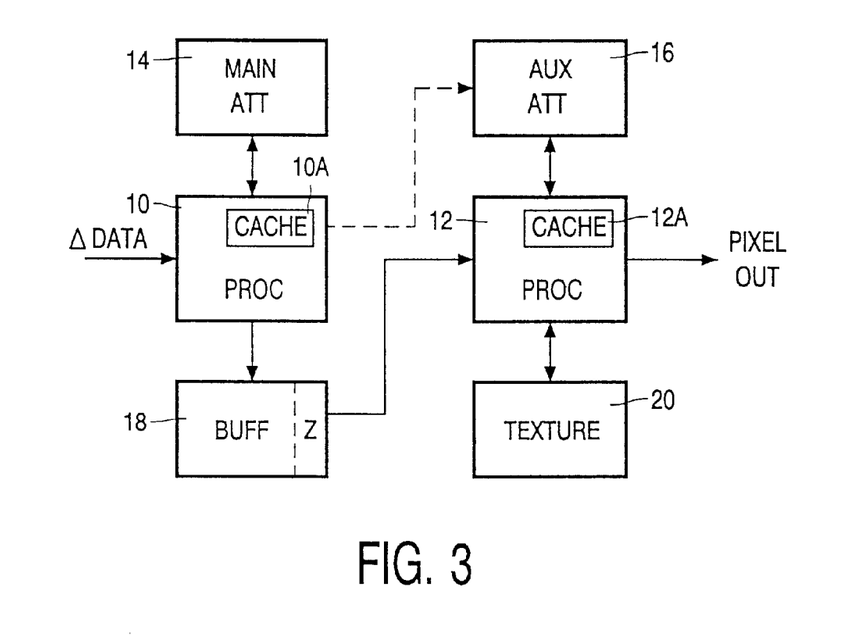
FIG. 3 is a block schematic diagram of an image processing system embodying the present invention.

An image processing apparatus embodying the invention is shown in FIG. 3, comprising a two-stage apparatus with main and auxiliary attributes being handled separately. Each stage comprises a processor 10,12 (each with a local cache 10A, 12A) coupled with a respective attribute buffer 14,16, with the main attribute processor 10 having an input to receive data in the form of an indexed face set of triangular polygons making up an image, with the main attributes comprising 3D (view-space) co-ordinates for the triangle vertices. As will be described below with reference to FIG. 5, an introductory routine is applied to the input data—either prior to supply to the processor 10, or within it—to perform some basic calculations and to separate the triangle attributes for supply to the appropriate one of the main attribute store 14 or (as indicated by the dashed line) auxiliary attributes store 16.

The processed main attribute data is passed to a data and depth buffer 18 for output to the auxiliary stage. The auxiliary stage takes this generalised interpolation and applies it for each of the different auxiliary attributes (e.g. texture mapping from map store 20, colouring, surface normals) to generate an output pixel value, suitable for supply to a frame buffer and thence to a display.

The main attribute buffer 14 is off-chip and holds the incrementally interpolated attributes used in anti-aliasing and z-buffering for each triangle to be rendered as evaluated at the magic point. The main attribute cache 10A is on-chip and holds the incrementally interpolated attributes for each triangle currently being rendered as saved and restored between tiles. The triangle to tile conversion procedure identifies how many tiles are impacted by each triangle, so it is possible to maintain a reference count for each triangle. This reference count is decremented each time a triangle is processed as part of a tile. When the reference count reaches zero the triangle's attributes are no longer required and can be flushed from the cache 10A. Tiles are read out in raster scanning order, so triangles that are tall will persist in the cache for a sizeable fraction of the time taken to process the frame. In certain circumstances, it may be necessary to flush a triangle's attributes from the cache, even if its reference count is non-zero: it is undesirable to write the current values of incrementally interpolated attributes back to the off-chip attribute buffer, so when the attributes are next requested by the cache a mechanism is provided to restore the values as they were last interpolated given the value at the magic point.

In the present architecture, triangle parameters at the magic point can be incrementally interpolated to an adjacent pixel, from there to another adjacent pixel and so on until values have been generated for each impacted pixel within the tile. The interpolated values are then stored in the main attribute cache ready for use in the next tile impacted by the triangle. Thereafter, previously incrementally interpolated values retrieved from the main attribute cache are incrementally interpolated along a path that ends at a pixel inside the current tile, whereupon incremental interpolation proceeds for impacted pixels within the current tile. The zigzag scanning sequence is such that the current tile impacted by the triangle is often horizontally adjacent to the previous such tile, and always nearby, hence time wasted moving along this path is minimised. Incremental interpolation uses one pixel steps in x and y. Simple shifts allow steps in powers of two pixels; using steps corresponding to the dimensions of a tile facilitates a tile seek mode that minimises the time taken to acquire the first pixel in a tile. This is the mechanism used to recover interpolated attribute values after they have been prematurely flushed from the main attribute cache 10A.

As values are incrementally interpolated at each pixel they define a so-called pixel fragment. Pixel fragments impacted by the triangle are passed to a pixel fragment buffer where they are either accepted (and therefore contribute to the final image) or are rejected (because they are occluded). Pixel fragments that do not impact the triangle are rejected. If the pixel fragment is accepted the incrementally interpolated s/z and t/z values are divided by 1/z to obtain s and t, which are then stored in the pixel fragment buffer. Division by 1/z must be done as each pixel fragment is created by incremental interpolation.

The division process to obtain s and t starts with priority encoders to convert the integer values of s/z, t/z and 1/z into floating point values. Next, the higher order bits of the 1/z mantissa are fed to a small (e.g. 512 word) lookup table to obtain coarse values of z and $z^2$. The value of z supplied by the table is the first term of the Taylor Series expansion of the reciprocal of 1/z. The value of $Z^2$ supplied by the table is multiplied by the lower order bits of the 1/z mantissa to obtain the second term of the Taylor series expansion. The first and second terms are then added to give the mantissa of z to 15 fractional bits. The z mantissa is then multiplied by the s/z and t/z mantissae to give s and t mantissae. The exponents of s/z, t/z and 1/z are then combined to obtain the exponents of s and t. Finally, integer values of s and t are obtained by shifting their mantissae up or down in proportion to their respective exponents.

The exponent and mantissa of 1/z (rather than z) are packed together to create the inverse depth value used inside the pixel fragment buffer in order to determine the front to back ordering of pixel fragments. This representation is preferred over the usual integer representation because the effect of perspective is mirrored by the change in depth resolution that occurs due to the use of a floating point mantissa.

Referring still to FIG. 3, the auxiliary attribute buffer 16 is off-chip and holds attributes that are not required until after hidden surface removal, namely the attributes required for texturing and shading, for example texture map addresses for the store 20. The auxiliary attribute cache 12A is on-chip and holds the attributes for each triangle currently being textured and shaded. Tile based rendering means that successive pixel fragments read from the pixel fragment buffer apply to different triangles, so a cache is vital.

Figure 4:
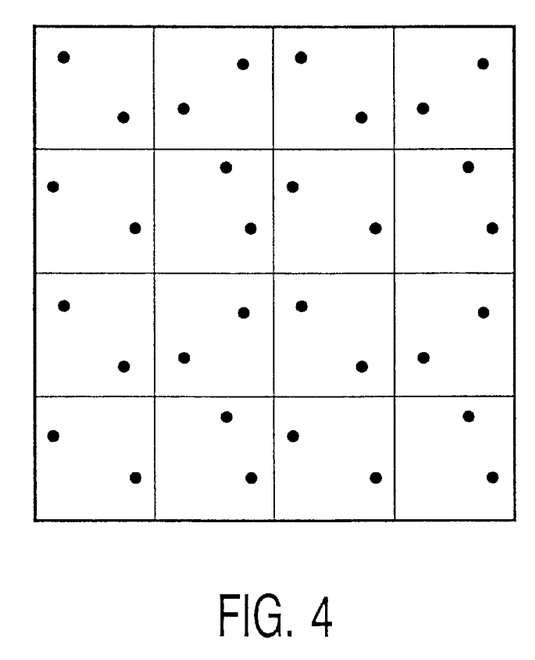
FIG. 4 represents a sample point array on a half pixel spacing grid.

In order to achieve the desired granularity in the output image, each pixel is considered as an area rather than a point. Multiple I-O tests are performed at different sampling points close to the pixel centre to determine what fraction of the pixel area is covered by the triangle. The combined result of the multiple I-O tests is referred to as the inside bit vector; bit N in this vector is the result of the I-O test at the $N^{th}$ sampling point. The present architecture uses 32 sampling points per pixel. A basic pattern of 8 sampling points per pixel is translated in each of four diagonal directions to give 32 points covering the pixel footprint: FIG. 4 is a graphical illustration of the pattern of the 32 sampling points.

The present architecture uses incremental interpolation to derive values of s/z, t/z and 1/z at pixel centres (the magic points). Adding offset values derived from the incremental interpolation deltas to the current values of s/z, t/z and 1/z at the pixel centre provides values of s/z, t/z and 1/z at each sampling point. These values are combined to give an I-O boolean for each sampling point. The resulting booleans are then concatenated to give the inside bit vector. It will be noted that incremental interpolation of the inside bit vector does not require additional values to be saved and restored between tiles. The values at sampling points can be obtained from the values at a pixel centre and the associated per triangle (per tile) incremental interpolation deltas given knowledge of the 32 sampling point positions.

For use in hidden surface removal, the pixel fragment buffer is double buffered. One buffer assembles all those pixel fragments that impact the current tile and that are expected to make a visible contribution to the final image. The other buffer holds the pixel fragments assembled for the previous tile and supplies these to be textured and shaded. In general there will be more pixel fragments presented to the pixel fragment buffer than are read from it, due to some pixel fragments being rejected.

The pixel fragment buffer is arranged as a 2D array of pixel fragment stacks, one stack for each pixel in a tile, with each stack holding a number of pixel fragments. The pixel fragments are sorted such that successive fragments in the stack have a monotonically increasing depth from the view origin. When a pixel fragment is proposed for admission to the stack, its inverse depth (1/z) must be compared with the inverse depth of each fragment in the stack, and this must be done in parallel to maintain throughput. Multiple depth comparisons require the contents of the stack to be loaded into an array of comparators, and the stack to be rewritten with fragments in their new positions, possibly admitting the proposed fragment and rejecting one of the fragments previously in the stack. It is this operation that mandates tile based rendering in order that the stack can be implemented entirely on-chip without requiring any access to off-chip memory.

The description above relates to our co-pending application WO99/06957 referred to above. In that method and apparatus, a pixel fragment can be full or partial, depending on whether all or some of its inside flags are set; in other words, depending on whether the fragment is fully or partially covered by a triangle. Full fragments are opaque.

In the present invention, a translucent pixel fragment is treated as a partial fragment, because fragments behind a translucent fragment can be seen, in attenuated form.

Translucent pixel fragments are inserted into the pixel fragment buffer from front to back; the alpha values of the rendered pixel fragments are accumulated until the sum of the alpha values exceeds unity. A correction is then made as a function of the pixel fragments colour and alpha such that the summed alpha is equal to unity.

After the summed alpha has exceeded one, the amount of excess alpha is calculated and used to multiply the colour components of the last pixel fragment by a fraction equal to the excess alpha divided by the alpha of the last pixel fragment. This colour correction is then subtracted from the accumulated colour. A small lookup table allows the division to be performed in hardware at speed.

Subtracting the colour correction is preferred over a direct calculation of that fraction of the last fragment's colour that would make the summed alpha equal to one, because truncation effects in the necessarily simple high speed multipliers will tend to make the summed alpha slightly greater than unity. Truncation errors in the direct calculation method could cause the summed alpha to be slightly less than unity, and any algorithm that attempted to make summed alpha greater than or equal to unity would continue processing fragments unnecessarily.

As each translucent fragment is rendered, its colour (calculated at the pixel centre as a function of (s,t) co-ordinates) is attenuated in proportion to the product of several alpha values. One such alpha value is that of conventional translucency, another is that of texture translucency. A further alpha is that derived from the cumulative attenuation, i.e. the product of the opacities of those fragments in front of (and therefore rendered previously to) the current fragment.

There is yet another alpha, obtained by weighting and summing the inside flags according to the (typically Gaussian) filter function. Consider what happens if the pixel contains only two partially covering translucent pixel fragments and one fully covering opaque fragment, where the two translucent fragments are part of the same object and share a common edge, and to make the problem obvious both fragments have identical conventional translucencies and taken together cover the entire pixel. The cumulative attenuation due to the two partially covering translucent fragments is obviously equal to the cumulative attenuation due to a single translucent fragment covering the pixel. Unfortunately, the cumulative attenuation algorithm as described implicitly assumes that each translucent fragment covers the entire pixel, and including the alpha derived from inside flags does not help.

The pixel fragment buffer must therefore recognise groups of partial translucent fragments that between them cover all or part of the pixel and act in concert to attenuate successive fragments. By accumulating the alpha of each fragment in the group, this alpha can then be applied to fragments behind the group as a cumulative attenuation contribution for the group.

Such recognition is achieved as follows: assume fragments are being read out of a pixel fragment stack to be rendered. A group begins with a translucent partially covering pixel fragment and ends when the next fragment is either opaque or fully covering, or if the inside flags for all fragments in the group cover the pixel when bitwise ORed together. If the next fragment is opaque or fully covering, it is possible that the inside flags of the fragments in the group do not cover the pixel and therefore that the cumulative attenuation will be not quite right along edges.

For VRML and sometimes for Direct 3D, knowledge of which faces constitute a mesh is explicit. If the meshes are allocated mesh identifier codes (which can be hashed to efficiently encode the number of mesh identifiers present in any given pixel) than a change in the mesh identifier can be used to define the end of a group. This will usually catch the case where the group does not cover the pixel. It fails when the object is not back face culled, and the pixel contains a portion of the front and back surfaces of the object, and there is nothing to separate the two surfaces, and the entire object is built from one mesh, and the front facing pixel fragments do not cover the pixel; for example the case of a translucent sphere. A fix can be obtained by adding a bit to the mesh identifier to indicate front or back facing triangles.

After all proposed pixel fragments have been processed, each stack is read out in front to back order, starting with the nearest pixel fragment. To determine the visible coverage of each pixel fragment, i.e. the coverage of the visible (unoccluded) part of each fragment, an accumulator maintains the bitwise OR of the bit vectors formed from the inside flags of previously read fragments, the accumulated coverage of the current fragment. The visible coverage for the current fragment is then obtained by bitwise ANDing the bit vector formed from its inside flags with the complement of the accumulated coverage. After the visible coverage has been obtained, the accumulator is updated ready for the next fragment. Eventually, the accumulator will contain a bit vector of all ones. If the accumulated coverage becomes all ones before all fragments have been read out, any remaining fragments in the stack are discarded as invisible because they are fully occluded.

FIGS. 5 to 8 are supplemented flow charts illustrating the handling of data from initial receipt and preparation through to output of per-pixel values.

Figure 5:
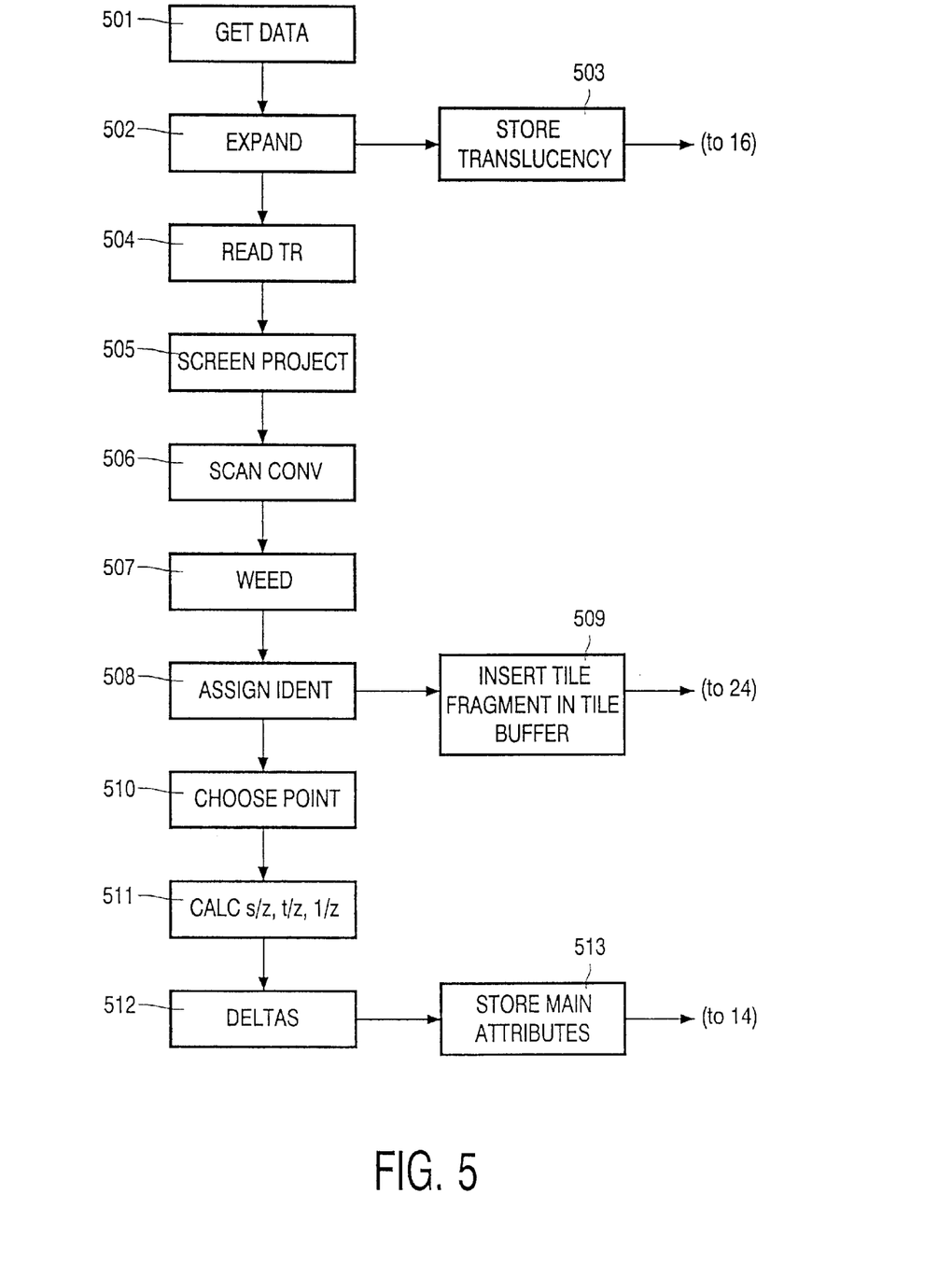
FIG. 5 is a flow chart representation of a primitive data acquisition and pre-processing routine generating data for supply to the system of FIG. 3.

The general data preparation routine is illustrated in FIG. 5 and commences at 501 with obtaining the data from a suitable source (for example a VRML data file obtained via the Internet). The data may be in the form of an indexed face set comprising a compacted data file listing triangle vertex co-ordinates together with auxiliary data specifying translucency values at the triangle vertices, surface normals and so forth. At 502, the compacted data file is expanded with the translucency data being extracted and stored at 503. From the expanded data of 502, the view-space vertex data of each triangle is read (at 504), with the triangles then being projected into two-dimensional screen space at 505.

As tile-based rendering is used, scan conversion is undertaken at 506 to convert each triangle to a series of tiles. Superfluous data, such as that for triangles only appearing in the footprint margin of a pixel kernel at the edge of the screen, is removed by a weeding operation at 507. Next, at 508, an identifier is assigned to each triangle, and the tiles, carrying one or more fragmented parts of triangles are inserted (at 509) into a tile buffer.

Following on from the assignment of an identifier for a triangle, the magic point is selected at 510, for which point s/z, t/z and 1/z are calculated (at 511) before calculation of the corresponding incremental values (deltas) at 512. These calculated values comprise the main attributes and the final stage 513 of the introductory procedure is to load them into the main attribute store (14; FIG. 3).

Figure 6:
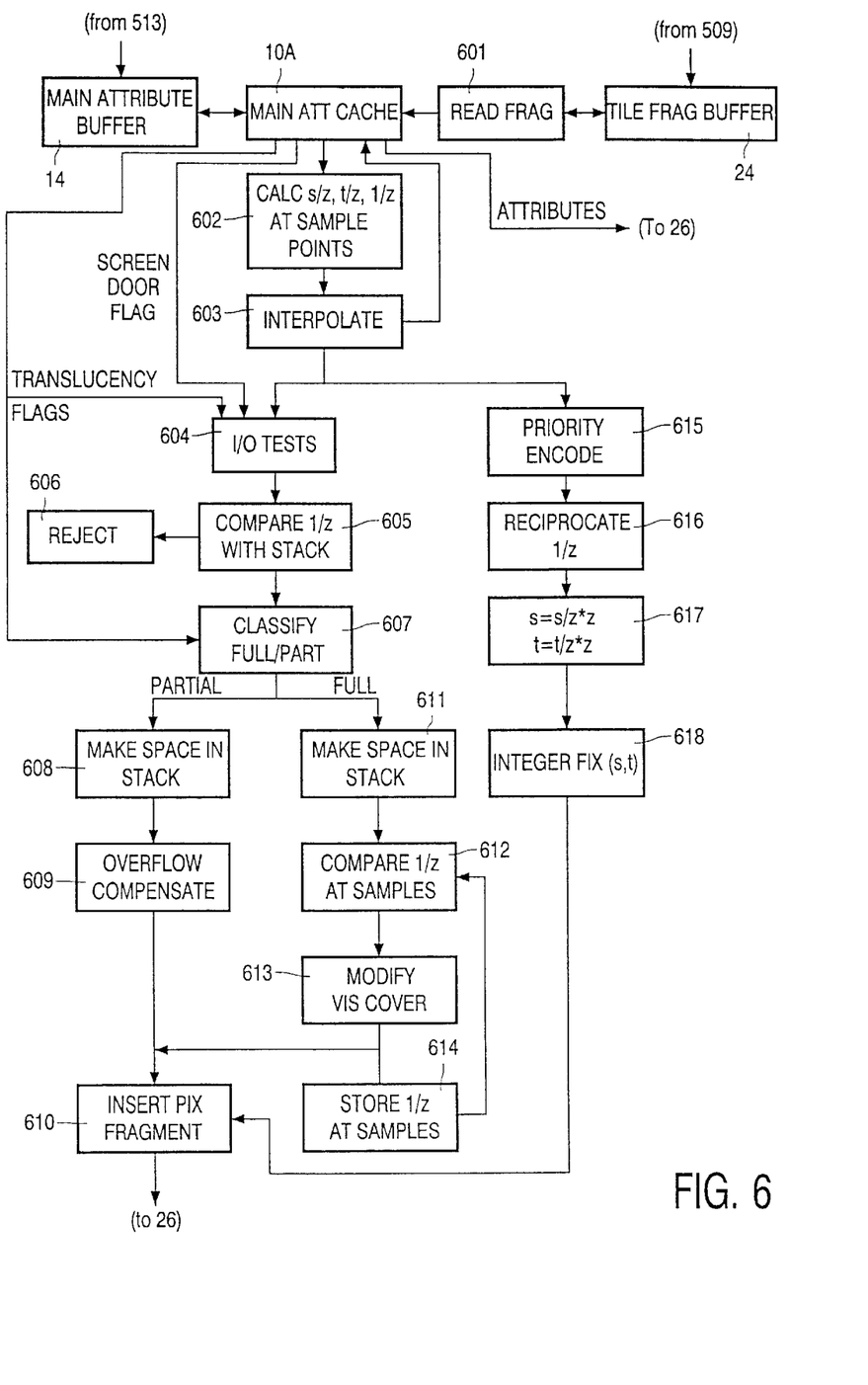
FIG. 6 schematically illustrates the operation of the main attribute handling stage of the system of FIG. 3.
Figure 7:
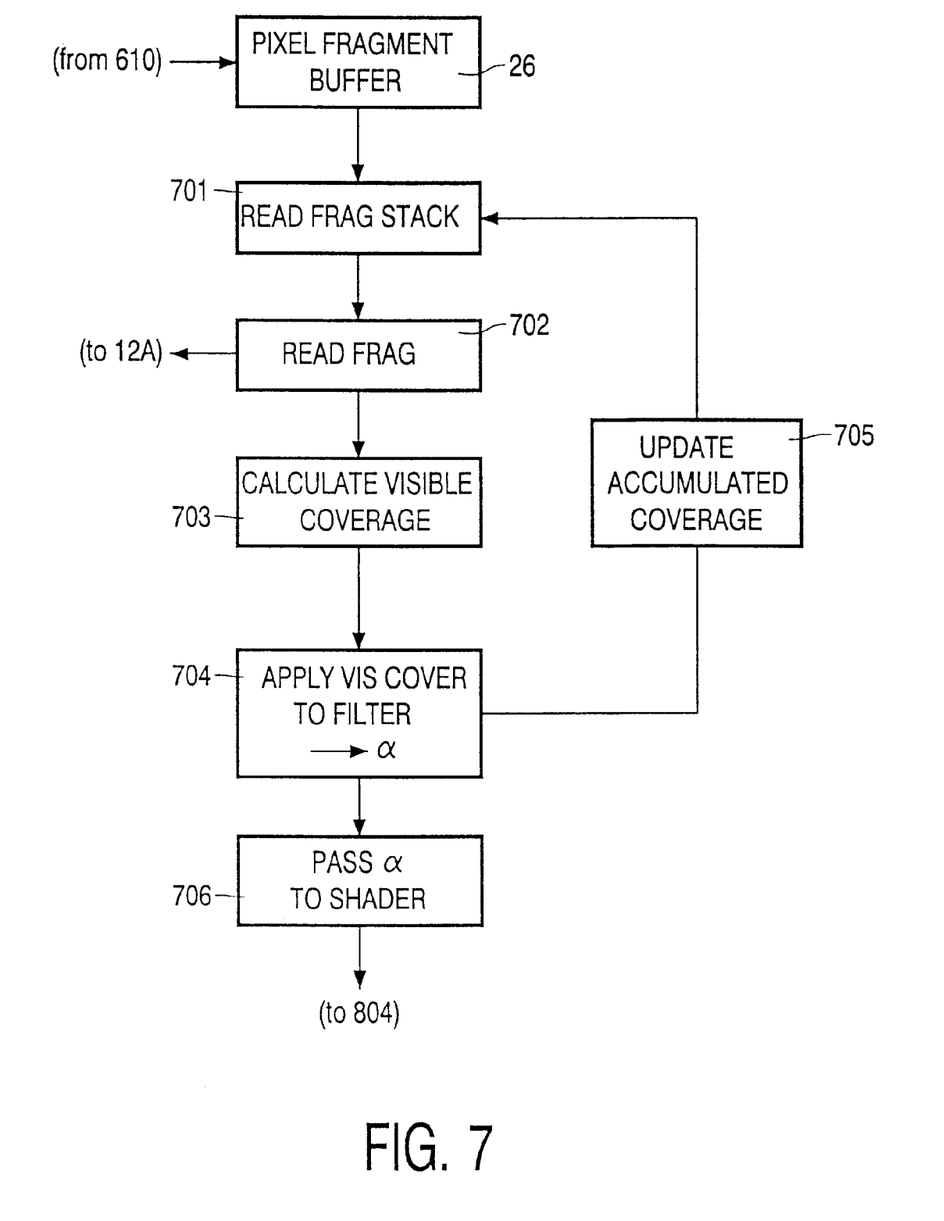
FIG. 7 schematically illustrates the operation of a pixel fragment sub-system of the main attribute handling stage in the system of FIG. 3.

The handling of the main attributes is shown in FIGS. 6 and 7. As shown at the head of FIG. 6, in addition to the main attribute buffer 14 loaded up by step 513, the cache memory 10A is provided together with a buffer 24 for the tiles containing triangle fragments (loaded up at 509). The cache 10A provides fast local (on-chip) memory loaded up from the external buffers 14, 24, and also provides attribute values (per-polygon alpha values, mesh identifier flags, and front/back-facing flags) to pixel fragment buffer 26 (FIG. 7).

The first operation 601 is the reading of fragments from tile buffer 24 to cache 10A. Next, from the cache, the values of s/z, t/z, and 1/z are calculated for each sampling point at 602. At 603, the values of s/z, t/z, and 1/z are interpolated, with the results returned to the cache.

I-O tests are performed at 604. The cache 10A indicates to the I-O test stage when screendoor translucency is being applied, and also provides translucency flags (to indicate that a fragment or pixel cannot simply be treated as opaque) to the I-O test stage.

During interpolation, the I-O tests are performed at 604 for each sample point to determine whether they lie inside or outside the triangle boundary, following which the 1/z value at that point is compared (605) with correspondingly positioned sample point values from other triangles to determine whether that triangles contribution to the pixel is to be accounted for or rejected (606). If the 1/z comparison is successful, the pixel fragment is classified at 607 as full or partial, as defined above.

Contributions of partial pixel fragments (which in this invention means full but translucent fragments) are added to the stack at 608. If the stack is already full, the action of making space in the stack at 608 will result in overflow (generally removal of the rearmost fragment) which, if this leaves a sample point uncovered, requires compensation 609 to transfer the or each sample point in question to the tile of the new last fragment to maintain consistency. With the overflow problem resolved, the latest fragment is inserted into the stack (610) at the appropriate position (with the entries being depth sorted) and the value is sent to the pixel fragment buffer (FIG. 7). If, following 607, it transpires that the stack is not yet full, then a simple make-space operation is performed to move entries having greater depth than a new fragment down by one.

Full pixel fragment contributions are added to the stack at 611; this applies where there is a polygon intersection crossing the pixel, and would be treated as an opaque pixel but the contribution of each polygon to the final pixel colour is determined by looking at the sample points within the pixel.

Typically 32 points are used, see FIG. 4. At 612 1/z comparison at each sample point identifies which of the polygons is foremost at that point, and at step 613, modification of visible coverage, the final pixel colour is determined only from the foremost sample point value and added to step 610 for supply to the pixel fragment buffer. The stored values for 1/z at the samples are updated at 614.

While the above operations from I-O testing onwards are proceeding, the interpolator to data from 663 is subject to further operations, beginning with priority encoding at 615, followed by calculation of a reciprocal for 1/z (i.e. to restore z) at 616. With the values of z, values of s and t are recovered at 617 by calculating (s/z)*z and (t/z)*z, with integer values for s and t being fixed at 618. These values are added at step 610 and then stored with the fragments in the pixel fragment buffer 26, shown at the head of FIG. 7.

From the fragment buffer, the alpha value of each stack of pixel fragments is pooled at 701, and the fragment data read out to the cache memory 12A in the auxiliary handling section at 702. At 703, the extent of visible coverage of a tile by the triangle fragments is calculated from the alpha value, is applied to a filter at 704, and a value α is obtained and passed to update the fragment stack at 705, then to step 702 via 701. At 706, α is output to a pixel shading stage in the auxiliary attribute handling stage (FIG. 8).

The possibility of alpha values accumulated by application of the Gaussian filter function exceeding the permitted value of unity has been referred to above. The update accumulated coverage stage 705 is arranged to clamp any alpha value received from step 704 to unity.

Figure 8:
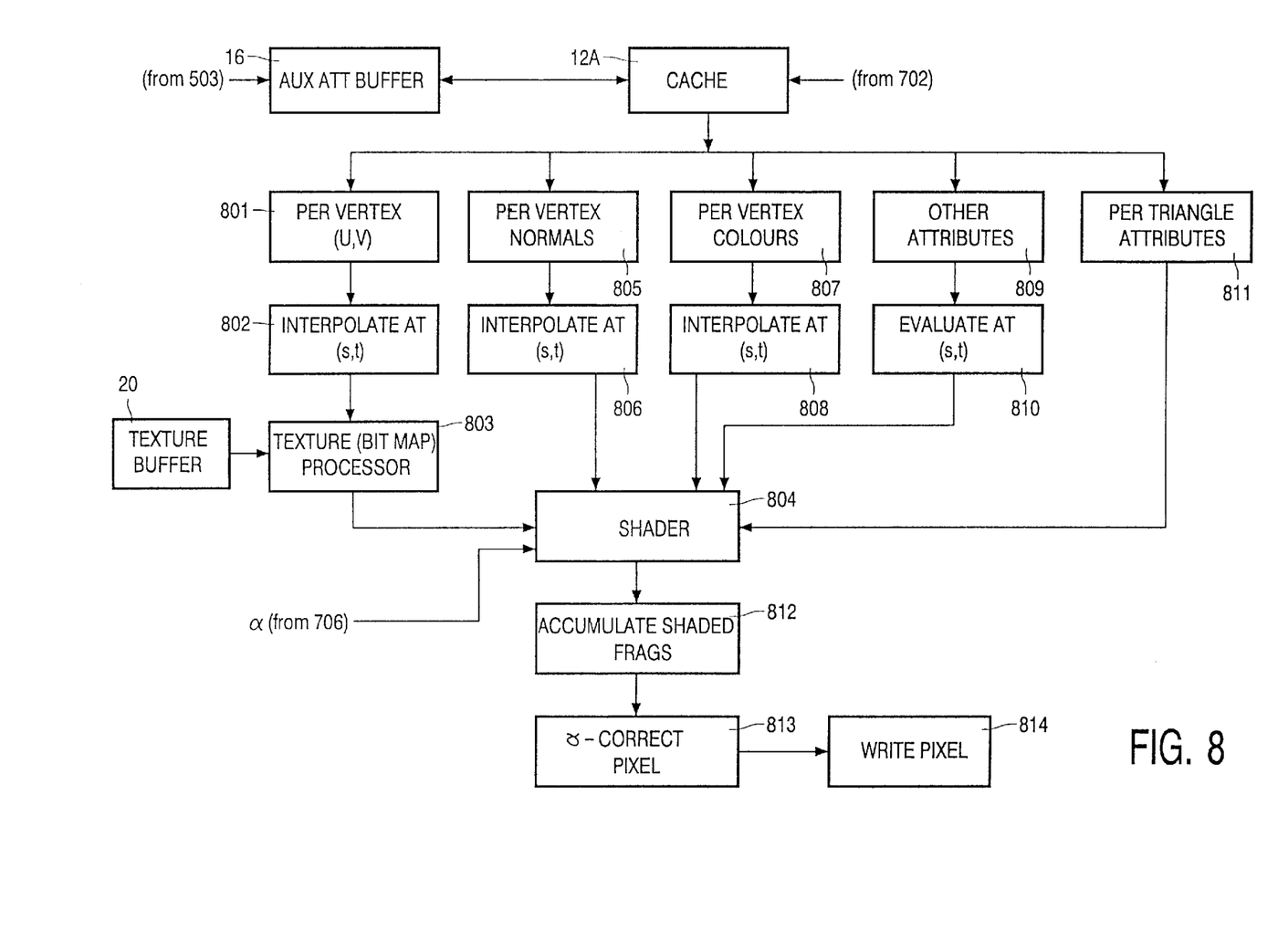
FIG. 8 schematically illustrates the operation of the auxiliary attribute handling stage of the system of FIG. 3.

The auxiliary attribute handling stage of FIG. 8 is, like the main attribute stage of FIGS. 4 and 5, intended to be provided on a single chip with the on-chip cache 12A provided to receive the prepared tile data from the main stage and translucency values extracted at 503 on expansion of the indexed face set. As shown, each different type of attribute is handled in parallel, starting with texture values identified by texture space co-ordinates (U,V) for each triangle vertex at 801. These are interpolated (802) at (s,t) using the parameterised co-ordinate system with the output passed to a bit-map texture processing stage 803 coupled with a texture buffer (map store) 20. The output from processor 803 is passed to a pixel shader stage 804. As shown, per vertex normals identified at 805 are similarly interpolated at 806; likewise pixel colours specified at triangle vertices at 807 and interpolated at 808. The colours are varied (for example by overwriting) by the shader 804 when there is an overlying translucent fragment (ref. Step 613). The general case of other attributes is indicated at 809 (these also being evaluated at (s,t) 810) with per triangle attributes at 811. As with the processor 803, the outputs of 806, 808, 810, and 811 provide inputs to the shader 804, along with the previously calculated α value.

The output of the shader goes to an accumulator for the shaded pixel fragments at 812 and, following gamma correction of the pixel at 813, the shaded pixel is output at 814. Gamma correction is not left to the display driver, as is commonly done in workstations, since gamma correction for anti-aliasing is most critical at low intensities. Truncating to the usual 8 bits per colour component and then applying gamma correction has been found to give noticeable irregularities along anti-aliased edges, whilst performing gamma correction before truncating restores smooth edges.

The (s,t) technique described hereinabove reduces the size of depth buffer entries, yet permits the handling of translucency. The (s,t) technique can also be applied to conventional translucency or texture translucency.

As set out above, calculation of inside flags at 32 sampling points makes 32 1/z values available for intersection anti-aliasing. The numeric precision and long word lengths required for the use of s/z, t/z for inside outside tests are tolerable when calculating (s,t) at a pixel centre, but impose a considerable burden when used to perform 32 inside, outside tests using parallel hardware.

The solution is to use simple screen space edge equations and screen space Manhattan edge distances, which can use shorter word lengths and can require less hardware, with the benefit that screen space edge distances can be calculated so as to avoid gaps and cracks due to finite numeric precision.

Figure 9A:
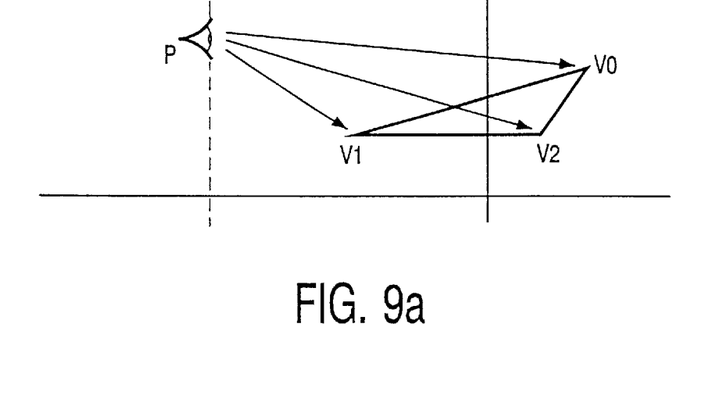
FIGS. 9(a) and 9(b) illustrate the technique of vertex reflection.

An objection to this solution is that set up must perspect view space co-ordinates into screen space. As shown in FIG. 9(a) there is no problem when all three vertices V0, V1, V2 of a triangle are in front of a viewer P, or all behind a viewer (not shown) and culled.

Figure 9B:
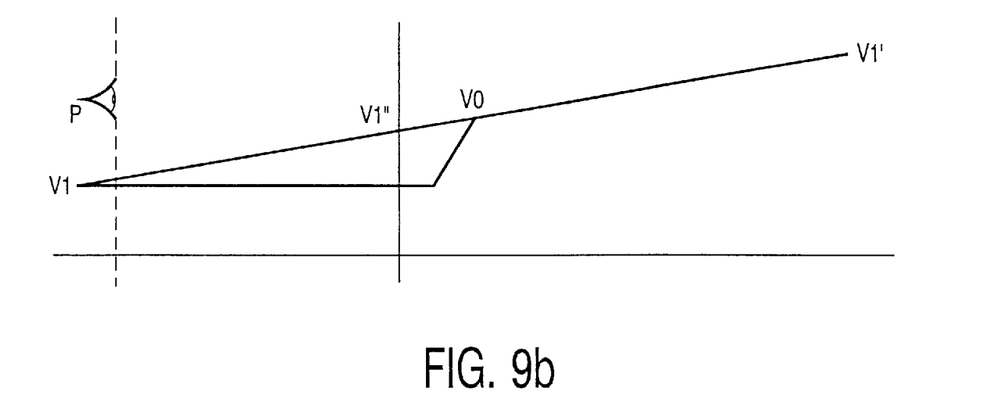

A problem does arise however if the triangle straddles the plane Z=0 as shown in FIG. 9(b). The vertex V1 behind the viewer would project incorrectly, and this leads to incorrect edge equations.

One solution is conventional clipping, but application of the known technique of vertex reflection may be more efficient. This is shown in FIG. 9(b) which indicates that vertex V1 is reflected about vertex V0 along a line through both vertices, giving V1'=V1−(V1−V0). V1' is on the same line as before but is now in front of the viewer P. V0 and V1' can be correctly projected into screen space to construct a valid screen space edge equation.

If the known vertex reflection technique is applied to shared triangle edges, the same vertex is modified for both faces sharing the edge, so the edge remains free from gaps and cracks.

If vertices are shared inside a mesh, vertex reflection would create additional vertices, in that a vertex behind a viewer would be reflected twice, once along each of the two edges at whose intersections the vertex lies. In the method of the invention in which view space vertices are used to calculate s/z, t/z and 1/z, the benefits of the technique of perspective projection on shared vertices are offset by the need to transport both view and screen space vertices; in addition vertices behind the viewer must be perspected twice. It is therefore beneficial if only view space vertices are transported, and perspective projection is performed for each vertex of each triangle.

From reading the present disclosure, other modifications will be apparent to persons skilled in the art. Such modifications may involve other features which are already known in the design, manufacture and use of image processing apparatus and devices and component parts thereof and which may be used instead of or in addition to features already described herein.

What is claimed is:

1. An image processing method for rendering a two dimensional pixel image from a plurality of triangular image primitives to be projected onto an image plane, in which per-pixel attribute values, derived by interpolation from values held for the triangle vertices, are mapped onto respective pixels within the projected triangular primitives, in which, for each triangle:

prior to projection, the triangle is parameterised with a respective two-dimensional co-ordinate system with the co-ordinate axes (s,t) concurrent with respective edges of the triangle and an origin coincident with the vertex between said edges;

during projection, a generalised interpolation function is applied in terms of the parameterising co-ordinate system, determining parameter values at positions within the triangle in terms of the two-dimensional co-ordinate system;

following projection, the determined parameter values at positions within the triangle determine contributions from stored values for one or more attributes at each vertex, to give attribute values at each pixel;

characterised in that said parameter values at positions within the triangle are translucency values.

2. A method according to claim 1 in which a translucent pixel fragment, whether fully or partially covered by a triangle, is characterised as a partial fragment.

3. A method as claimed in claim 1, wherein a pixel is tested to determine whether the centre of the pixel lies inside or outside a triangle using perspective correct interpolants s/z, t/z and 1/z, where z is a depth value for the pixel.

4. A method as claimed in claim 3, wherein the test to determine location inside or outside a triangle is further performed at each of a plurality of sample points within a predetermined distance of the pixel centre.

5. A method as claimed in claim 4, wherein the line defined by the intersection of two triangles is anti-aliased at each pixel using the inverse depth 1/z at said plurality of sample points.

6. A method according to claim 5 in which translucent pixel fragments are inserted into a pixel fragment buffer from front to back; the alpha values of the rendered pixel fragments are accumulated until the sum of the alpha values exceeds unity; and a connection is made as a function of the colour and alpha of the last pixel fragment such that the summed alpha is equal to unity.

7. A method according to claim 6 in which the final colour of a pixel is determined from the point value of the foremost sample.

8. An image processing apparatus configured to render a two dimensional pixel image from data defining a plurality of triangular image primitives to a projected onto an image plane, the apparatus including interpolation means arranged to derive per-pixel attribute values from values held for the triangle vertices, and data handling means arranged to map said per-pixel attribute values onto respective pixels within the projected triangular primitives:

calculation means coupled to receive, the data defining said triangular primitives, prior to projection, and arranged to parameterise each triangle with a respective two-dimensional co-ordinate system with the co-ordinate axes (s,t) concurrent with respective edges of the triangle and an origin coincident with the vertex between said edges;

projection means operable to apply a generalised interpolation function to each triangle and in terms of the parameterising co-ordinate system, such as to derive parameter values at positions within a triangle in terms of said two dimensional co-ordinate system; and pixel shading means configured to derive, from said determined parameter values at positions within the triangle, contributions from stored values for one or more attributes at each vertex, such as to give attribute values at each pixel, and to combine per pixel attribute values from all triangles and provide a per pixel colour value, characterised in that the apparatus further comprises means to characterise a pixel as a translucent pixel, and when a translucent pixel overlays another pixel, to provide a per pixel colour value derived from the colour of a foremost translucent pixel.

9. An image processing apparatus according to claim 8, further comprising storage means to hold a plurality of data stacks, each stack being associated with a respective pixel and holding entries identifying the translucency of one or more triangles impacting the pixel; means to inset translucent pixel fragments into its stock from front to back; means to accommodate the alpha values of rendered translucent pixel fragments until the sum of the alpha values exceeds unity; and means to apply a connection as a function of the colour and alpha of the last pixel fragment such that the summed alpha is equal to unity.

\* \* \* \* \*